F. BROMLEY.
POULTRY AND STOCK DRINKING FOUNTAIN.
APPLICATION FILED MAY 6, 1915.
1,175,045.
Patented Mar. 14, 1916.
2 SHEETS—SHEET 2.
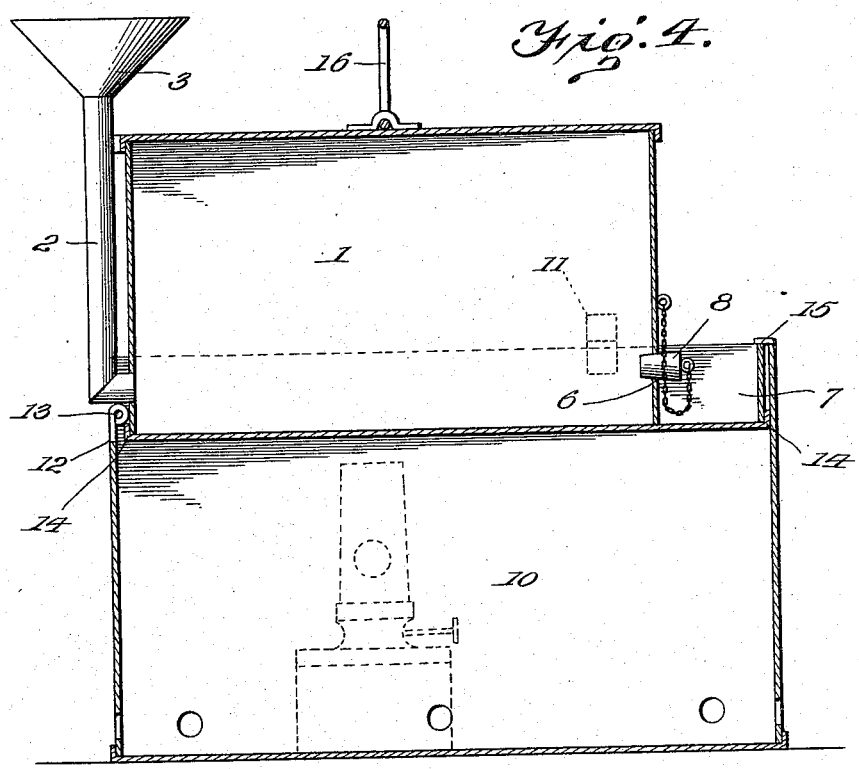
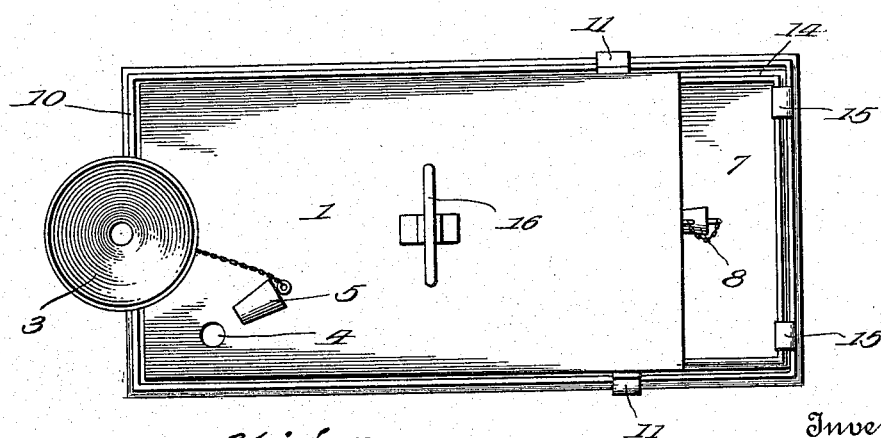

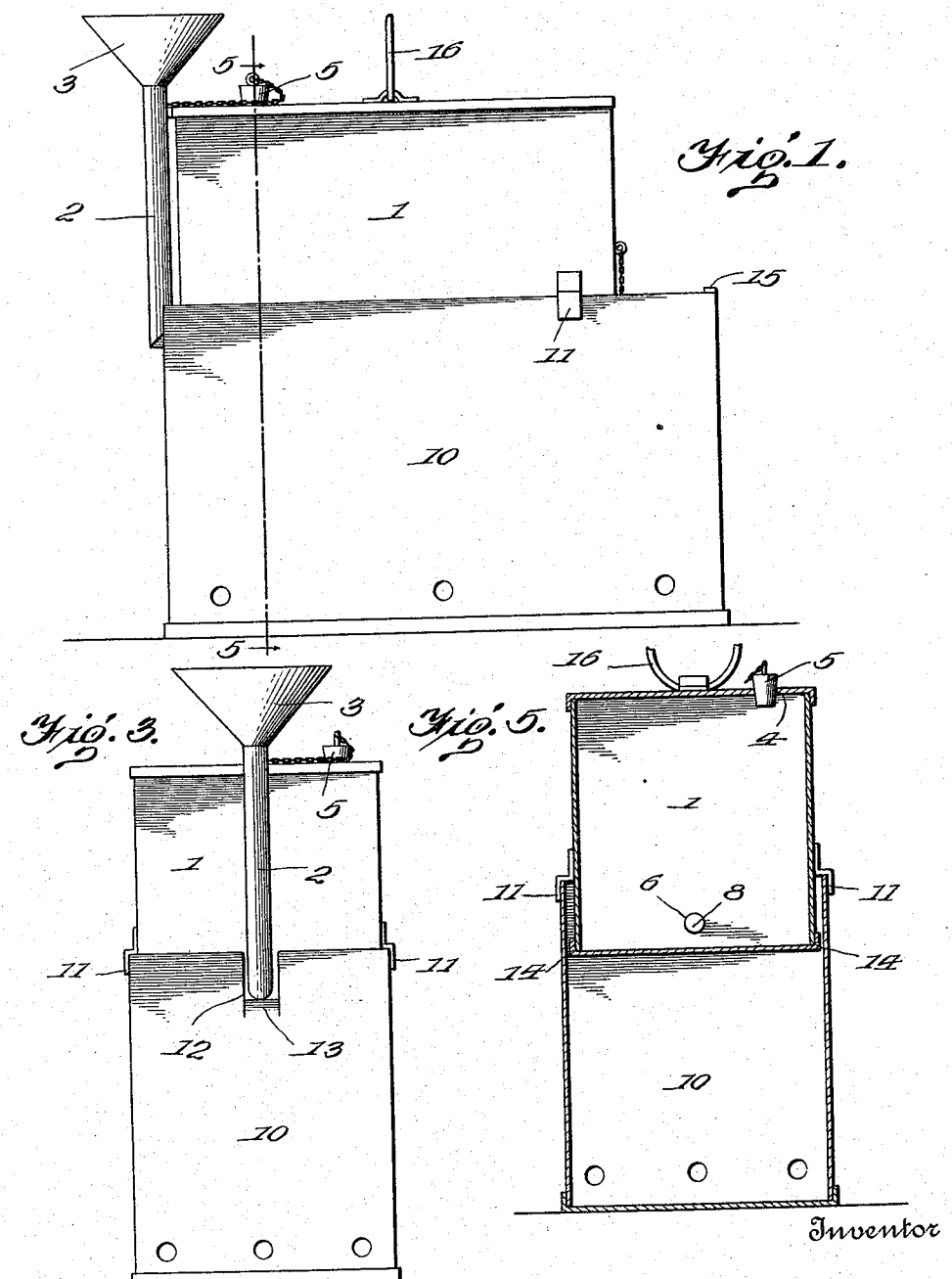

UNITED STATES PATENT OFFICE.

FRANK BROMLEY, OF MACON, ILLINOIS.

POULTRY AND STOCK DRINKING-FOUNTAIN.

1,175,045.

Specification of Letters Patent.   Patented Mar. 14, 1916.

Application filed May 6, 1915.   Serial No. 26,332.

*To all whom it may concern:*

Be it known that I, FRANK BROMLEY, a citizen of the United States, residing at Macon, in the county of Macon and State of Illinois, have invented certain new and useful Improvements in Poultry and Stock Drinking-Fountains; and I do declare the following to be a full, clear, and exact description of the invention, such as will enable others skilled in the art to which it appertains to make and use the same.

My invention relates to improvements in drinking fountains and has for its object the provision of a very simple and efficient device of this character which may be easily and inexpensively manufactured and marketed, provision being made for heating the water within the tank for preventing freezing thereof during the colder seasons.

With this general object in view, the invention resides in certain novel features of construction and in the unique combinations of parts to be hereinafter fully described and claimed.

In describing the invention, I shall refer to the accompanying drawings wherein like reference characters designate corresponding parts throughout the several views and wherein:

Figure 1 is a side elevation of a fountain constructed in accordance with my invention; Fig. 2 is a top plan view thereof; Fig. 3 is a rear elevation; Fig. 4 is a central vertical longitudinal sectional view, and, Fig. 5 is a vertical transverse section as seen along the plane indicated by the line 5—5 of Fig. 1.

In these drawings which constitute a part of the application, the numeral 1 designates a rectangular tank at whose rear end an upright filling tube 2 is disposed, said tube being provided with a funnel 3 at its upper end, while its lower end is bent inwardly and discharges into the tank.

Adjacent the filling tube 2 or at any other preferred point, the top of the tank 1 is provided with a circular opening 4 which is normally closed by a plug 5, but which serves as an air vent when filling the tank. The front wall of the tank is also provided with a circular opening designated by the numeral 6, this opening being disposed near the lower end of said wall and delivering into a rectangular trough 7 which continues forwardly therefrom. When filling the tank, the opening 6 is closed by a plug 8, thus preventing the escape of fluid, while the plug 5 is removed, thus allowing the air displaced by the water in the tank to be expelled from the latter. When now the tank is filled, the plug 5 is tightly inserted into the opening 4 to prevent the entrance of air at this point, while the plug 8 is removed, with the result that air will enter the opening 6 and will rise through the water in the tank to the top of the latter, thus allowing said water to flow through said opening 6 into the trough 7, until the opening in question is closed by the body of water in said trough. The moment this takes place, however, the air supply to the tank 1 is cut off, thus stopping the flow of water into the trough 7 until the supply has been exhausted therefrom to such an extent as to again expose the opening 6, whereupon said trough will refill.

The construction previously described operates to advantage in heated poultry houses or in the warm spring, summer, and fall months, but in the colder months it becomes expedient to provide means for preventing the water from freezing in the tank. For this purpose, the rectangular lamp box 10 is provided, said box being of a size to slidably receive in its open upper end, the lower end of the tank 1 as clearly disclosed in Figs. 4 and 5. To prevent the tank 1 from dropping too far into the lamp box 10, most any preferred stop means may be provided, but I prefer to equip the sides of the tank 1 at the front ends thereof, with inverted L-shaped keepers 11 which receive therein the sides of the lamp box, thus preventing telescoping of the tank and box at this point. The rear end of the box 10, however, is provided with a rectangular notch 12 which receives therein the inwardly directed lower end of the filling tube 2, the notch 12 being preferably formed by striking the metal therefrom inwardly and by curling such metal to provide a locking spring 13 which, when the tank is inserted into the upper end of the box 10, snaps yieldably over the bead 14 which may either surround the bottom of said tank, or may be merely disposed at the rear end thereof. In fact, any other preferred type of projection could well be provided for coaction with the spring 13, and in some cases could well be eliminated. Its use, however, is preferable since it forces the tank forwardly to cause the upper edge of the trough 7 to rest beneath and abut a pair of flanges 15 which extend inwardly from the upper edge of the front wall of the lamp box. By so doing, it will be evident that when the entire device is carried by an appropriate handle 16 with which the tank 1 is provided there is no danger of the lamp box becoming detached. Furthermore, by exerting its tension to force the tank 1 forwardly, the spring 13 spaces the rear walls of the tank and the lamp box, thus providing a draft outlet for the lamp seen in dotted lines in Fig. 4, sufficient oxygen being supplied to this lamp through any number of openings near the bottom of the box 10.

From the foregoing description, taken in connection with the accompanying drawings, it will be evident that although very simple and inexpensive construction has been provided for the attainment of the desired end, the complete fountain will be very efficient in operation, and will possess a number of highly advantageous features, particular emphasis being laid upon the disposition of plugs or other valve means in combination with any preferred type of water inlet for the tank 1, and upon the construction provided for detachably retaining the tank and the lamp box connected one to the other. Furthermore, the provision of the filling tube 2 delivering into the bottom of the tank 1 is deemed a novel point, since by this disposition of the tube, the supply of water in the tank may be replenished before completely exhausted, without allowing air to enter the tank. Needless to say, this could not be accomplished were the water inlet so disposed as to deliver directly into the upper end of the tank.

I claim:

1. In combination, a drinking fountain having a filling tube disposed on its exterior and having its lower end turned inwardly into the fountain, a lamp box having an open upper end receiving the lower end of the fountain, one wall of the box being notched at its upper edge for the reception of the inturned end of the filling tube, a spring carried by said box and disposed at the lower side of the notch, a projection on the fountain yieldably engaged by the spring, and stop means limiting the insertion of the fountain into the lamp box.

2. In combination, a lamp box having an open upper end and having a notch in its upper edge, a drinking fountain having its lower end inserted in the open upper end of the lamp box, stops carried by the fountain and abutting the upper edge of said box, and an upright filling tube disposed on the exterior of the fountain and having its lower end turned inwardly into the same and received by the notch, whereby said inturned end of the tube constitutes an additional stop.

In testimony whereof I have hereunto set my hand in presence of two subscribing witnesses.

FRANK BROMLEY.

Witnesses:
 H. R. WOODCOCK,
 R. W. WOODCOCK.

Copies of this patent may be obtained for five cents each, by addressing the "Commissioner of Patents, Washington, D. C."